Oct. 25, 1966   F. SIROLA   3,280,674
WORK SUPPORT FOR RECEIVING SLENDER STOCK TO BE TURNED
Filed June 9, 1964   2 Sheets-Sheet 1

INVENTOR
FRANK SIROLA.
BY Borst & Borst
ATTORNEYS

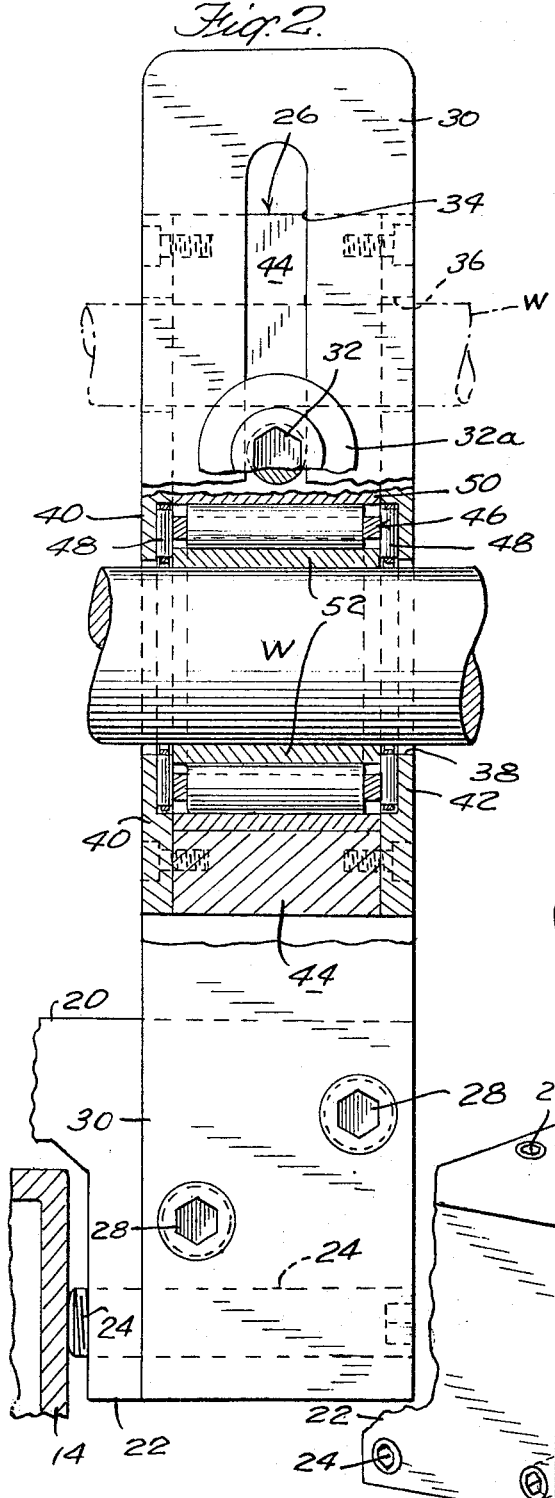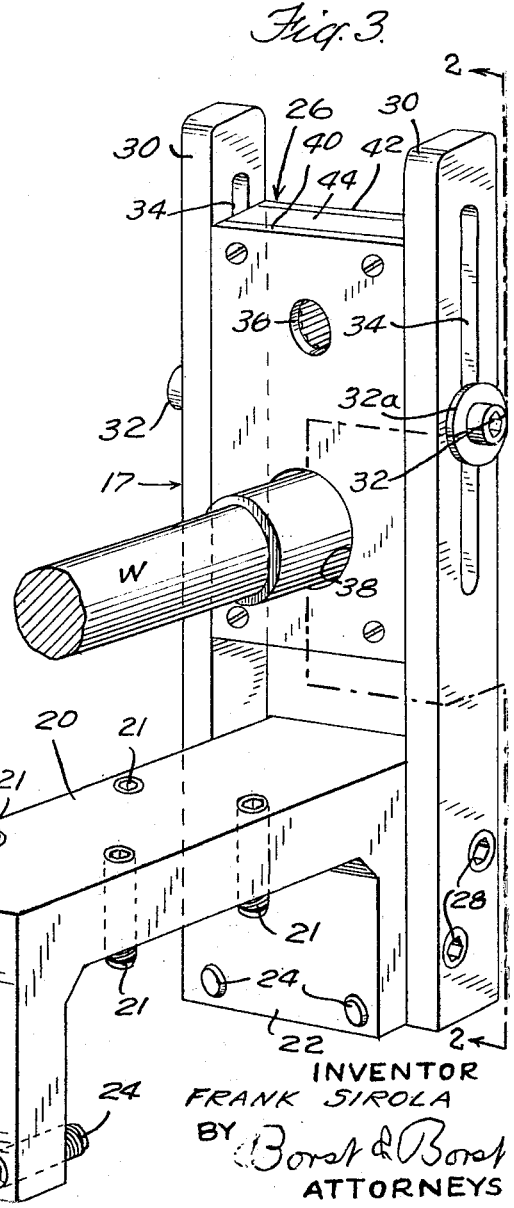

United States Patent Office 3,280,674
Patented Oct. 25, 1966

3,280,674
WORK SUPPORT FOR RECEIVING SLENDER STOCK TO BE TURNED
Frank Sirola, % Aloris Tool Co., Inc., 419 Getty Ave., Clifton, N.J.
Filed June 9, 1964, Ser. No. 373,711
6 Claims. (Cl. 82—38)

This invention relates to work supports adapted to be mounted on lathes for receiving slender stock to be turned and, in particular, on the lathe carriage whereby the support is disposed proximate the cutter element so as to firmly hold the work and prevent chatter or vibration thereof.

One object of the invention is to provide a work support for lathes for receiving slender stock and which support is adjustable for different size stock and can be positioned in elevation for precise alignment with the head stock of the lathe.

Another object of the invention is to provide a work support of said character which is adjustable according to the work and is adapted to securely support the work near the cutting tool during operation.

Difficulties have been encountered in supporting the work between the chuck and tail stock of a lathe particularly if the work is of slender stock which has a tendency to bow, chatter and vibrate when engaged by the cutting tool. This invention contemplates a work support for slender stock which firmly holds the work adjacent the cutting tool with both the support and cutting tool being mounted on the carriage and moving together. Thus the work slides through the support with the movement of the carriage.

There is set forth below a more detailed description of the invention which is taken in conjunction with the accompanying drawings, in which:

FIGURE 2 is a sectional view of the invention with parts in elevation, on a larger scale taken on line 2—2 of FIGURES 1 and 3;

FIGURE 3 is a perspective view of the device.

Figure 1:
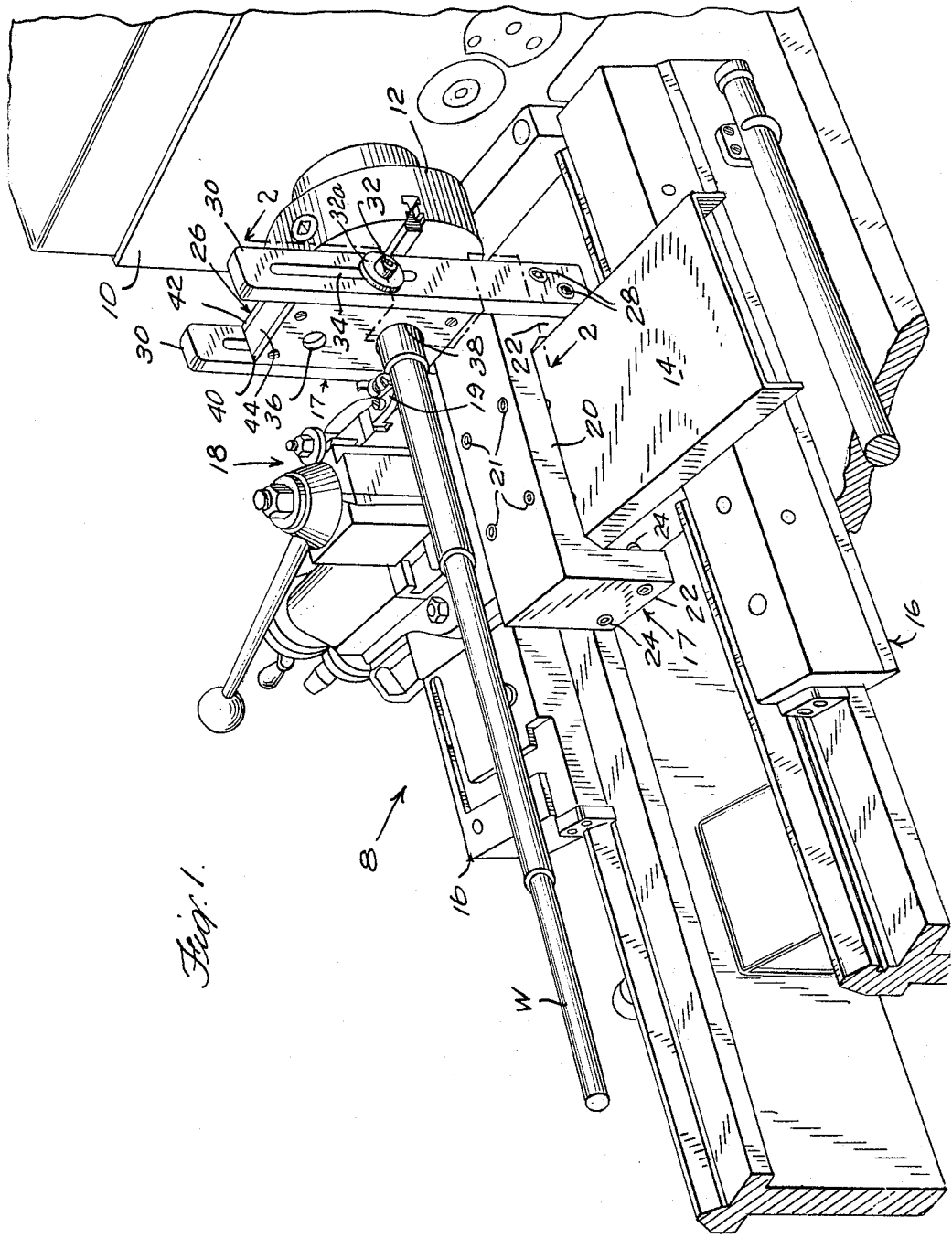
FIGURE 1 is a perspective view of a portion of a lathe looking from the rear toward the head stock with the work support mounted on the saddle of the carriage in accordance with the invention.

Referring to the drawings the lathe 8 includes a head stock 10 and chuck 12 in which one end of the work is secured and turns therewith. A work support assembly 14 is mounted on the carriage 16 of the lathe and a tool post 18 is mounted on the slide of the carriage with a cutter tool 19 for turning or facing the work.

The assembly 17 comprises a base 20 having a depending portion 22 on each side of the carriage. Clamping bolts 24 extend through the portions 22 and engage the carriage, the assembly being positioned laterally over the carriage for alignment according to the relative position of the head stock. Vertical adjusting bolts 21 extending through tapped holes in the base 20 impinge on the top of the carriage and are accurately adjusted to dispose the base horizontally and a work support member 26 vertically.

Attached by screws 28 to the base 20 are upwardly extending members 30 between which the work support member 26 is adjustably disposed for varying the elevation thereat and which is supported by screws 32 backed by washers 32a extending through slots 34 in the members 30.

The work support member 26 is formed with a plurality of openings of different sizes for receiving different sizes of stock. Two openings 36 and 38 are shown through one of which the work W extends. The work support member 26 is turned on the screws 32 with the screws adjusted vertically in the slots 34 to dispose the desired opening in alignment with the center of the chuck 12.

The member 26 comprises front and rear face plates 40 and 42 secured to a body 44 disposed therebetween through which the openings 36 and 38 extend. Arranged between the face plates 40 and 42 at each opening 36 and 38 is a bearing 46 such as a ball or roller bearing and at the ends of the bearing 46 at each opening 36 and 38 are thrust bearings 48. The body 44 is apertured to receive each of the bearings 46 with the outer races 50 thereof being fixed to the body 44 and the inner races 52 rotating with the work and being of a size to snugly receive the work so as to hold the work against vibration yet permitting the work to slide therethrough with the movement of the carriage. For this reason the internal diameter of the inner races 52 are slightly smaller than the diameter of the openings 36 and 38 respectively. The inner races 52 are preferably of bronze and may be removed by removing one of the face plates. Inner races may be substituted having different internal diameters for accommodating different sizes of stock. The face plates 40 and 42 are annularly recessed surrounding the openings 36 and 38 for mounting the thrust bearings 48 against which the ends of the inner races engage and take up the thrust imparted by the work.

In operation the work support and the cutter tool move with the carriage, with the work sliding through the selected aperture in the work support member as it is being faced or cut. The supporting structure for the member and the member itself can be adjusted in position to provide accurate alignment with respect to the head stock. There is thus afforded opportunity for precision cutting on the machine.

Various modifications of the invention may be effected by persons skilled in the art without departing from the scope and principle of the invention as defined in the appended claims.

I claim:
1. In a lathe or like device having a head stock and a movable carriage, a cutter tool mounted on said carriage, a work support member mounted on the carriage proximate, said member including a holder having selective means for slidably supporting different sizes of work, said holder being vertically adjustable and pivotal on a horizontal axis transverse to said work whereby said holder may be precisely aligned with respect to said head stock.

2. In a lathe or like device having a head stock and a movable carriage, a cutter tool mounted on said carriage, a work support member mounted on the carriage proximate said tool, said member having different size apertures formed therein, a pair of uprights on said carriage, said member being pivotably supported by and adjustably positionable on said uprights.

3. In a lathe or like device having a head stock and a movable carriage, a cutter tool mounted on said carriage, a work support member mounted on the carriage proximate said tool, said member having different size apertures formed therein, a pair of uprights having slots formed therein, means extending through said slots pivotably supporting said member between said uprights, a base straddling said carriage and supporting said uprights and means for adjustably positioning said base relative to said carriage and clamping the base in the adjusted position.

4. A work support for receiving slender stock to be turned in a lathe, said work support including a base having an upper portion and depending ends, means carried by said upper portion and said ends adapted for engagement with the carriage of the lathe for adjustably mounting the work support on the carriage, a pair of uprights affixed to said base to extend upwardly from the forward end thereof and having longitudinally extending slots, a work support member arranged between said uprights, means extending through said slots mounting said work support member between said uprights and permitting adjusting said work support member longitudinally of said uprights and angularly with reference thereto, and said work support member having at least one opening for receiving the stock to be turned and through which the stock slides with the movement of the carriage.

5. In a work support for receiving slender stock to be turned in a lathe as set forth in claim 4 in which the work support member is arranged adjacent to the cutting tool mounted on the carriage of the lathe and the work support member is provided with a bearing including a rotatable sleeve forming the opening for receiving the stock and which sleeve rotates with the stock.

6. In a device as defined in claim 2 wherein said apertures contain bearing elements adapted to rotatably support a work therein.

References Cited by the Examiner
UNITED STATES PATENTS

| | | | |
|---|---|---|---|
| 199,217 | 1/1878 | Manning | 82—38 X |
| 771,136 | 10/1904 | Manning | 82—28 X |
| 2,842,998 | 7/1958 | Kostka | 82—39 |
| 2,850,791 | 9/1958 | Evans | 82—38 X |

FOREIGN PATENTS

| | | |
|---|---|---|
| 218,529 | 6/1957 | Australia. |
| 551,885 | 3/1943 | Great Britain. |

WILLIAM W. DYER, Jr., *Primary Examiner.*

L. VLACHOS, *Assistant Examiner.*